No. 609,403. Patented Aug. 23, 1898.
A. BENSON.
REAR WHEEL ADJUSTING DEVICE.
(Application filed Mar. 1, 1897.)
(No Model.)
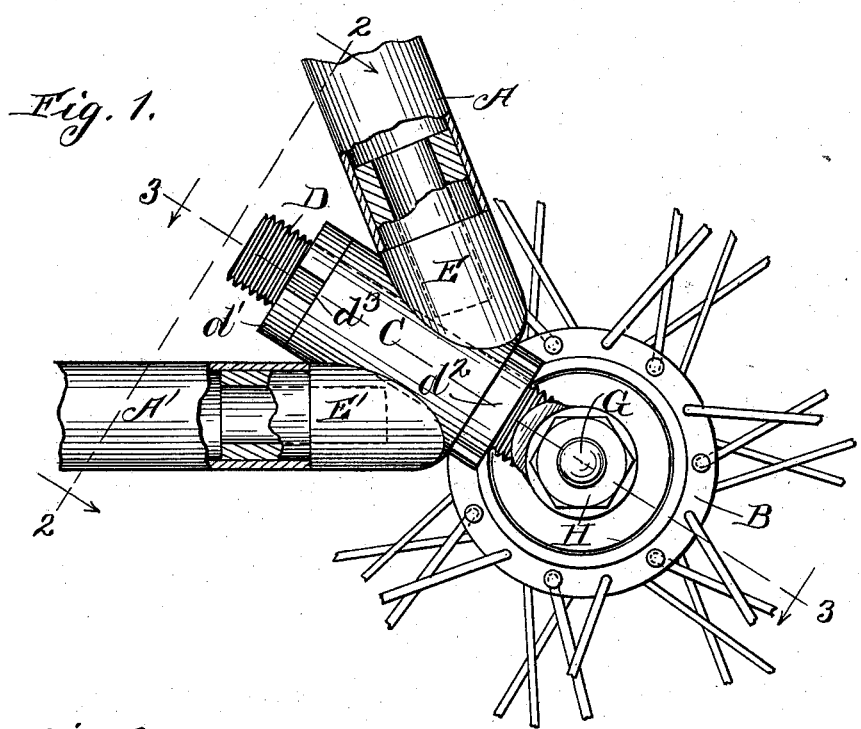
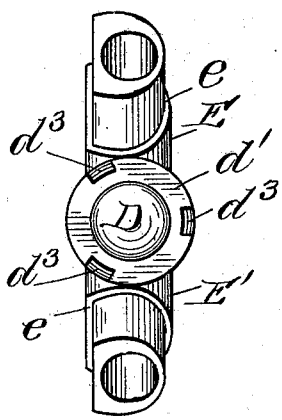
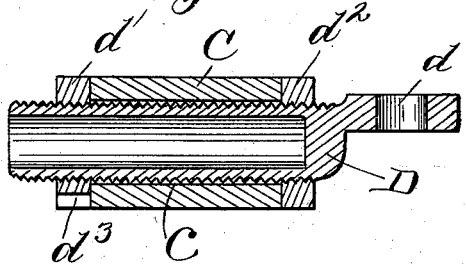
Witnesses:
W. J. Jaeker,
E. T. Duggan.
Inventor:
Andrew Benson,
By Chas. C. Tillman,
Atty.

UNITED STATES PATENT OFFICE.

ANDREW BENSON, OF PEORIA, ILLINOIS, ASSIGNOR TO THE ROUSE, HAZARD & COMPANY, OF SAME PLACE.

REAR-WHEEL-ADJUSTING DEVICE.

SPECIFICATION forming part of Letters Patent No. 609,403, dated August 23, 1898.

Application filed March 1, 1897. Serial No. 625,600. (No model.)

*To all whom it may concern:*

Be it known that I, ANDREW BENSON, a citizen of the United States, residing at Peoria, in the county of Peoria and State of Illinois, have invented certain new and useful Improvements in a Rear-Wheel Adjustment and Tube Connection for Bicycles; and I do hereby declare the following to be a full, clear, and exact description of the invention, such as will enable others skilled in the art to which it appertains to make and use the same.

This invention relates to an improved means of adjusting the rear wheels of bicycles and in the connection of the rear-fork tubes with the rear brace-tubes; and it consists in certain peculiarities of the construction, novel arrangement, and operation of the various parts thereof, as will be hereinafter more fully set forth and specifically claimed.

The main objects of my invention are to attain the utmost simplicity of adjustment with the highest degree of accuracy and to afford a strong and durable connection for the rear-fork tubes and brace-tubes and also to enable the rear wheel to be removed without disturbing its adjustments or the adjustment of the sprocket-chain.

With the forms of adjustment now on the market it is found difficult to gain ready access to the rear hub, since the adjusting member is usually provided with a slot moving over the rear axle as the adjustment takes place. This slot is also unsightly and the projecting fork-arms thereof liable to catch in the clothing. For the latter reasons also it is found objectionable to have the adjusting device project below or behind the rear axle at all; but in such constructions as locate it within the frame, between the brace and rear-fork rods thereof, the forms now on the market are open to the objection that the part connected with the rear axle has not a sufficient bearing to give it the necessary rigidity. The present invention is designed to cure these defects as far as possible.

Referring to the accompanying drawings, Figure 1 is a view in side elevation, partly in section, of a portion of the rear part of the frame of a bicycle and a part of the rear wheel thereof, showing my invention in position and illustrating the manner of connecting the rear-fork tubes and rear brace-tubes on each side of the wheel and of adjusting the wheel in respect to the sprocket-chain. Fig. 2 is an end view in elevation, taken on line 2 2 of Fig. 1, with the tubes removed, showing one of the adjusting and connecting devices detached; and Fig. 3 is a longitudinal central sectional view taken on line 3 3 of Fig. 1.

Similar letters refer to like parts throughout the different views of the drawings.

A represents one of the tubes of the rear fork, and A' one of the brace-tubes, which may be made of any suitable size, form, and material and are joined together in pairs by means of my improved connection, so that they will be located on each side of the rear wheel B of the bicycle. Inasmuch as the adjusting and connecting device used on each pair of the tubes on either side of the wheel are of similar construction, arrangement, and operation, I have illustrated the tubes on one side of the wheel only and shown them connected by means of my improvement or device, which consists of a tubular piece C, usually cylindrical in form, which is provided with a smooth opening $c$ to receive the screw-threaded adjusting rod or bolt D, provided at its lower end with an opening or eye $d$ to receive the axle G or spindle of the rear wheel.

On the upper and lower portions or surfaces of the cylinder C are located at angles thereto and preferably connected therewith, either integrally or by brazing, the arms or extensions E and E' for the rear-fork tube and brace-tube, respectively. These arms are preferably formed hollow and flattened on their surfaces adjacent to the wheel, as shown in Fig. 2 of the drawings, in order to render them lighter and stronger and to economize in the amount of metal required. The outer ends of said arms are preferably reduced to receive the tubes A and A', which are brazed or otherwise secured thereon and whose ends abut against the annular shoulders $e$ on the arms produced by said reduced portions.

Passing through and guided closely in the opening $c$ in the cylinder C is the adjusting bolt or rod D, which is also preferably formed with a hollow bore for the sake of strength, lightness, and a saving in metal and which may be extended or retracted by means of the screw-threaded nuts $d'$ and $d^2$, the former of which is located on the upper part of the adjusting-bolt and rests against the corresponding part of the cylinder C, while the latter nut engages the lower portion of the bolt and rests against the like part of the cylinder C, which forms a socket or bearing for said bolt, as is apparent. The length of this cylinder is such that it also forms a guide for the bolt to prevent its wabbling in place and avoid the necessity for any other form of guide for the rear axle. These nuts are usually provided in their peripheries with recesses $d^3$ to receive the ends of a spanner, especially the nut between the arms E and E', and which cannot be readily reached with an original wrench.

As shown in Fig. 1 of the drawings, the axle G of the rear wheel has its bearings in the eyes at the lower ends of the adjusting-bolts, which, as before stated and is well understood, are located on each side of the wheel and are held in position on the axle or spindle G by means of the axle-nuts H, which are of the ordinary or any preferred construction.

While I have shown the tubes A and A' secured on the extensions E and E', yet I may sometimes unite them in another manner and provide them at their juncture with tubular pieces to receive the adjusting-bolts, and for this reason I do not desire to limit myself to the specific construction shown in the drawings.

From the foregoing and by reference to the drawings it will be seen and clearly understood that as the axle of the rear wheel rests within the eyes $d$ of the adjusting bolts or rods D, located on each side of the wheel, it may be adjusted toward or from the frame, as is required by the length of the sprocket-chain, by simply turning the nuts $d'$ and $d^2$ in the proper direction to retract or extend the adjusting-bolts. It is also apparent that in such adjustment it is unnecessary to loosen the axle-nuts H and that the adjustment of the parts of the wheel will be undisturbed.

Having thus fully described my invention, what I claim as new, and desire to secure by Letters Patent, is—

The herein-described rear-wheel adjustment and tube connection for bicycles and the like, the same comprising a threaded bolt D having an eye $d$ at its extreme rear end engaging the rear axle, an unbroken cylinder C having a smooth interior in which the body of said bolt fits closely but adjustably, nuts engaging the threads of the bolt and bearing against the opposite ends of the cylinder, two divergent arms rigidly connected with the exterior of the cylinder between its extremities and remote from its ends, and means for connecting the brace-tube and rear-fork tube of the wheel-frame with said arms, all as and for the purpose set forth.

ANDREW BENSON.

Witnesses:
HENRY C. GIBSON,
A. B. HAZARD.